(12) United States Patent
Wengerter et al.

(10) Patent No.: US 7,003,709 B2
(45) Date of Patent: Feb. 21, 2006

(54) HYBRID ARQ RETRANSMISSION METHOD WITH REDUCED BUFFER SIZE REQUIREMENT AND RECEIVER THEREFOR

(75) Inventors: Christian Wengerter, Kleinheubach (DE); Alexander Golitschek Edler Von Elbwart, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 429 days.

(21) Appl. No.: 10/358,386

(22) Filed: Feb. 5, 2003

(65) Prior Publication Data

US 2003/0167433 A1 Sep. 4, 2003

(30) Foreign Application Priority Data

Feb. 15, 2002 (EP) .................................. 02003578

(51) Int. Cl.
G08C 25/02 (2006.01)
H03M 13/03 (2006.01)
H03D 1/00 (2006.01)
H04L 27/06 (2006.01)

(52) U.S. Cl. ........................ 714/748; 714/794; 375/341
(58) Field of Classification Search ................ 714/748, 714/749, 751, 758, 780, 790, 752, 746, 786, 714/794, 795
See application file for complete search history.

(56) References Cited

U.S. PATENT DOCUMENTS 6,499,128 B1 * 12/2002 Gerlach et al. ............. 714/755
6,625,778 B1 * 9/2003 Nakamura et al. .......... 714/786
2003/0074626 A1 * 4/2003 Coker et al. ................ 714/752

FOREIGN PATENT DOCUMENTS

| EP | 0771092 | 5/1997 |
|---|---|---|
| EP | 1018816 | 7/2000 |

OTHER PUBLICATIONS

Narayanan K. R. et al., "A Novel ARQ Technique Using the Turbo Coding Principle", IEEE Communications Letters, IEEE Service Ceneter, vol. 1, ppgs. 49-51, Mar. 1997.

Law C-F et al, "A Modified Adaptive Hybrid FEC/ARQ Protocol Using Turbo Codes with Incremental Redundancy Transmission", Vehicular Technology Conference, vol. 3, conf. 50, ppgs. 1670-1674, Sep. 1999.

(Continued)

Primary Examiner—Christine T. Tu
(74) Attorney, Agent, or Firm—Stevens, Davis, Miller & Mosher, LLP (57) ABSTRACT

A hybrid ARQ retransmission method in a communication system wherein data packets consisting of identical or partly identical modulation symbols encoded with a forward error correction (FEC) technique prior to transmission are retransmitted based on a repeat request and subsequently bit-level combined on the basis of soft-information values. The calculation of the soft-information values being input into an FEC decoder comprises the steps of calculating and buffering the soft-information values of the most significant bits (MSBs) of each (re)transmitted data packet; combining, for matching modulation symbols, the current soft-information values of the MSBs with the buffered soft-information values of at least one of the previous received transmitted packets; and calculating the soft information for at least some of the remaining bits (XSBs) from the combined soft information values of the MSBs.

15 Claims, 3 Drawing Sheets

OTHER PUBLICATIONS

S. Kallel; "Analysis of a Type II Hybrid ARQ Scheme with Code Combining", IEEE Transactions on Communications, vol. 38, No. 8, Aug. 1990, pp. 1133-1137.

S. Kallel, et al.; "Throughput Performance of Memory ARQ Schemes", IEEE Transactions on Vehicular Technology, vol. 48, No. 3, May 1999, pp. 891-899.

D. Chase; "Code Combining-A Maximum-Likelihood Decoding Approach for Combining an Arbitrary Number of Noisy Packets", IEEE Transactions on Communications, vol. comm.-33, No. 5, May 1985, pp. 385-393.

B. A. Harvey, et al.; "Packet Combining Systems Based on the Viterbi Decoder", IEEE Transactions on Communications, vol. 42, No. 2/3/4, Feb./Mar./Apr. 1994, pp. 1544-1557.

C. Berrou, et al.; "Near Shannon Limit Error-Correcting Coding and Decoding:Turbo-Codes(1)", IEEE 1993, pp. 1064-1070.

S. Le Goff, et al.; "Turbo-Codes and High Spectral Efficiency Modulation", Telecom Bretagne, France Telecom University, IEEE 1994, pp. 645-649.

A. Burr; Modulation and Coding for Wireless Communications, Pearson Education, Prentice Hall, pp. 132-135 and 310-315.

* cited by examiner

HYBRID ARQ RETRANSMISSION METHOD WITH REDUCED BUFFER SIZE REQUIREMENT AND RECEIVER THEREFOR

The present invention relates to a hybrid ARQ retransmission method in a communication system. Further, the invention concerns a receiver embodied to carry out the method of the invention.

A common technique in communication systems with unreliable and time-varying channel conditions is to detect and correct errors based on automatic repeat request (ARQ) schemes together with a forward error correction (FEC) technique called hybrid ARQ (HARQ). If an error is detected within a packet by a commonly used cyclic redundancy check (CRC), the receiver of the communication system requests the transmitter to send additional information (data packet retransmission) to improve the probability of correctly decoding the erroneous packet.

A packet will be encoded with the FEC before transmission. Depending on the content of the retransmission and the way the bits are combined with previously transmitted information, S. Kallel, *Analysis of a type II hybrid ARQ scheme with code combining*, IEEE Transactions on Communications, Vol. 38, No. 8, August 1990 and S. Kallel, R. Link, S. Bakhtiyari, *Throughput performance of Memory ARQ schemes*, IEEE Transactions on Vehicular Technology, Vol. 48, No. 3, May 1999 define three different types of ARQ schemes:

Type I: The erroneous received packets are not discarded and a new copy of the same packet is retransmitted and decoded separately. There is no combining of earlier and later received versions of that packets.

Type II: The erroneous received packet(s) is(are) not discarded, but are combined with additional retransmissions for subsequent decoding. Retransmitted packets sometimes have higher coding rates (coding gain) and are combined at the receiver with the stored soft-information from previous transmission(s).

Type III: Is the same as Type II with the constraint each retransmitted packet is now self-decodable. This implies that the transmitted packet is decodable without the combination with previously transmitted packets. This is useful if some transmitted packets are damaged in such a way that almost no information is reusable.

This invention is related to Type II and Type III schemes, where the received (re)transmissions are combined. HARQ Type II and III schemes are obviously more intelligent and show a performance gain with respect to Type I, because they provide the ability to reuse information from previously received erroneous transmission packets. There exist basically three schemes of reusing the information of previously transmitted packets:

Soft-Combining
Code-Combining
Combination of Soft- and Code-Combining

Soft-Combining

Employing soft-combining the retransmission packets carry identical or partly identical information compared with the previously received information. In this case the multiple received packets are combined either by a symbol-by-symbol or by a bit-by-bit basis as for example disclosed in D. Chase, *Code combining: A maximum-likelihood decoding approach for combining an arbitrary number of noisy packets*, IEEE Trans. Commun., Vol. COM-33, pp. 385–393, May 1985 or B. A. Harvey and S. Wicker, *Packet Combining Systems based on the Viterbi Decoder*, IEEE Transactions on Communications, Vol. 42, No. 2/3/4, April 1994.

In case of employing symbol-level combining, the retransmitted packets have to carry identical modulation symbols to the previously transmitted erroneous packets. In this case the multiple received packets are combined at modulation symbol level. A common technique is the maximum ratio combining (MRC), also called average diversity combining (ADC), of the multiple received symbols, where after N transmissions the sum/average of the matching symbols is buffered.

In case of employing bit-level combining the retransmitted packets have to carry identical bits to the previously transmitted erroneous packets. Here, the multiple received packets are combined at bit level after demodulation. The bits can be either mapped in the same way onto the modulation symbols as in previous transmissions of the same packet or can be mapped differently. In case the mapping is the same as in previous transmissions also symbol-level combining can be applied. A common combining technique is the addition of calculated log-likelihood ratios (LLRs), especially if using so-called Turbo Codes for the FEC as known for example from C. Berrou, A. Glavieux, and P. Thitimajshima, *Near Shannon Limit Error-Correcting Coding and Decoding: Turbo-Codes*, Proc. ICC '93, Geneva, Switzerland, pp. 1064–1070, May 1993; S. Le Goff, A. Glavieux, C. Berrou, *Turbo-Codes and High Spectral Efficiency Modulation*, IEEE SUPERCOMM/ICC '94, Vol. 2, pp. 645–649, 1994; and A. Burr, *Modulation and Coding for Wireless Communications*, Pearson Education, Prentice Hall, ISBN 0-201-39857-5, 2001. Here, after N transmissions the sum of the LLRs of the matching bits is buffered.

For both mentioned soft-combing techniques—from a decoder point of view—the same FEC scheme (with constant code rate preferably) will be employed over all transmissions. Hence, the decoder does not need to know how many transmissions have been performed. It sees only the combined soft-information. In this scheme all transmitted packets will have to carry the same number of symbols or bits.

Code-Combining

Code-combining concatenates the received packets in order to generate a new code word (decreasing code rate with increasing number of transmission). Hence, the decoder has to be aware of the FEC scheme to apply at each retransmission instant. Code-combining offers a higher flexibility with respect to soft-combining, since the length of the retransmitted packets can be altered to adapt to channel conditions. However, this requires more signaling data to be transmitted with respect to soft-combining.

Combination of Soft- and Code-Combining

In case the retransmitted packets carry some symbols/bits identical to previously transmitted symbols/bits and some code-symbols/bits different from these ones, the identical code-symbols/bits are combined using soft-combing while the remaining code-symbols/bits will be combined using code-combining. Here, the signaling requirements will be similar to code-combining.

Figure 1:
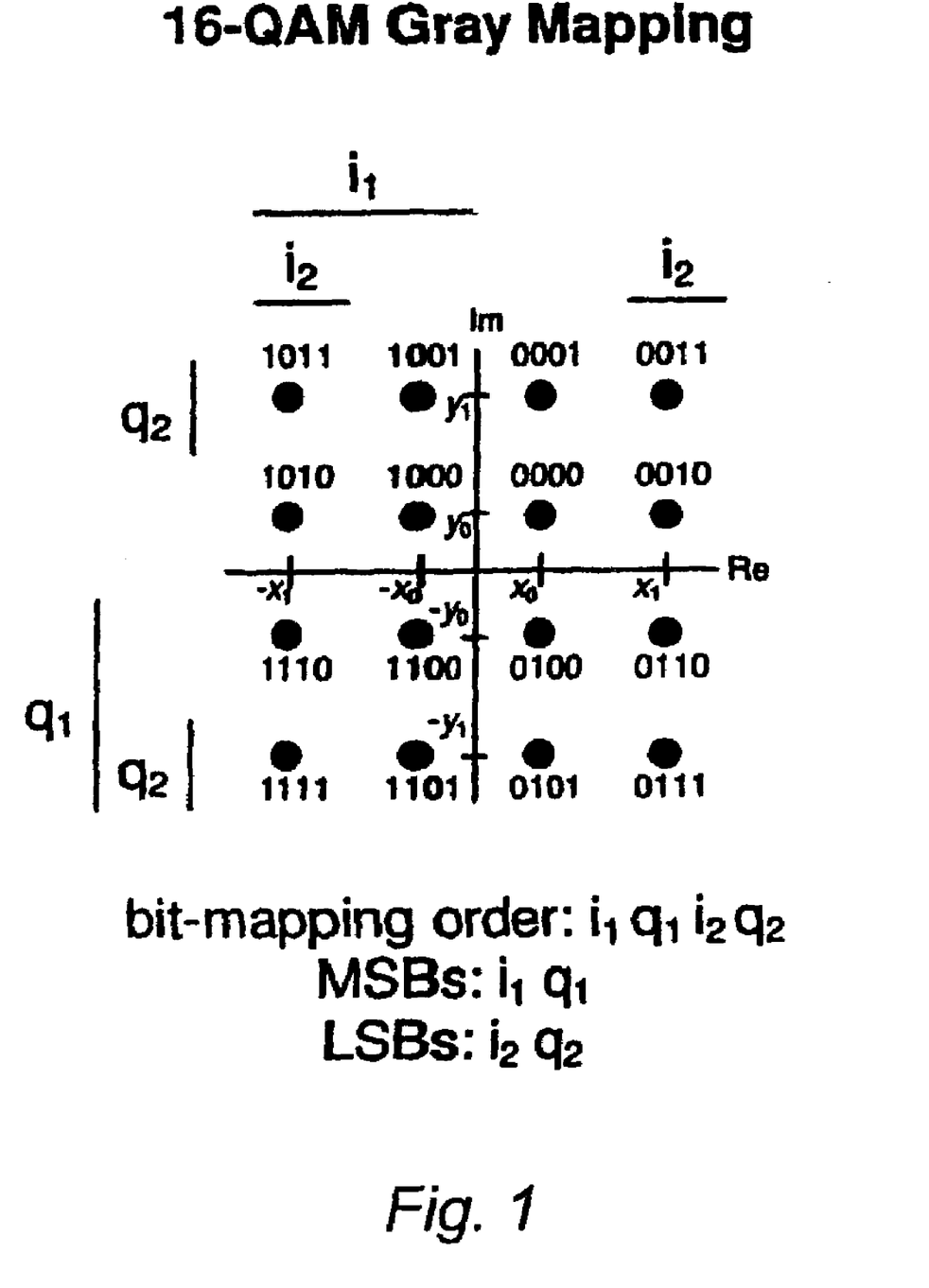
FIG. 1: a Gray encoded signal constellation for 16-QAM.

Employing a signal constellation for a 16 QAM modulation scheme according to FIG. 1 showing a Gray encoded signal constellation with a given bit-mapping order $i_1q_1i_2q_2$, the bits mapped onto the symbols differ significantly from each other in mean reliability in the first transmission of the packet. In more detail, bits $i_1$ and $q_1$ have a high mean reliability, as these bits are mapped to half spaces of the signal constellation diagram with the consequences that their reliability is independent from the fact of whether the bit transmits a one or a zero.

In contrast thereto, bits $i_2$ and $q_2$ have a low mean reliability, as their reliability depends on the fact of whether they transmit a one or a zero. For example, for bit $i_2$, ones are mapped to outer columns, whereas zeros are mapped to inner columns. Similarly, for bit $q_2$, ones are mapped to outer rows, whereas zeros are mapped to inner rows.

The combining of multiple received packets requires a buffering of the information from previously received packets. Depending on the possible combining methods, the modulation scheme and the packet size the buffer requirements per packet vary significantly. The total buffer-size requirement depends also on the higher layer ARQ protocol, which is usually a multiple of the buffer-size requirement per packet. For simplification pure soft-combining is described in this section. Same applies to the soft-combined buffering part for the combination of soft- and code-combining.

In case of symbol-level combining the soft-information according to the received modulation symbol has to be stored (complex value). This leads to a buffer-size requirement per packet $B_{SC}$, which can be approximately calculated as follows:

$$B_{SC} = \frac{2Nb_S}{\log_2(M)} + b_K \quad (1)$$

with

| | |
|---|---|
| N | number of encoded bits per packet |
| $\log_2(M)$ | number of encoded bits mapped onto one modulation symbol |
| $2b_S$ | bit-depth: Number of bits for representing one modulation symbol in buffer (I- and Q-part) |
| $b_K$ | bit-depth: Number of bits for representing the sum of the received power (all signal to noise ratios) by all packets; | where K is an optionally stored measure for the channel quality. If it is not stored, $b_K=0$.

In case of bit-level combining the soft-information of the bits have to be stored. This leads to a buffer-size requirement per packet $B_{BC}$, which is independent from the number of encoded bits mapped onto a modulation symbol:

$$B_{BC} = Nb_B \quad (2)$$

with

| | |
|---|---|
| N | number of bits per packet |
| $b_B$ | bit-depth: Number of bit representing one soft-information (e.g. LLR) in buffer |

The ratio of the required buffer-size for symbol-combining to bit-combining can be calculated by use of equations $$\frac{B_{SC}}{B_{BC}} = \frac{2b_S}{\log_2(M)b_B} + \underbrace{\frac{b_K}{Nb_B}}_{\substack{\text{small compared to 1, addend} \\ \text{since N is usually large and} \\ \text{usually } b_K/b_B \leq 1}} \quad (3)$$

Usually, the ratio of the bit-depths $b_B/b_S$ is between ⅔ and 1, which makes symbol-level combining requiring less buffer than bit-level combining from $\log_2(A)>2$. In case the performance for both combining methods is equal or close to equal, for complexity reasons then at the receiver for higher order modulation schemes ($\log_2(M)>2$) usually symbol-level combining is preferred.

As it was shown in the previous section—in case of high-order modulation—the soft-combining at symbol-level has lower buffer-size requirements per packet at the receiver compared to bit-level combining. This leads to the fact that symbol-level combining is mostly preferred over bit-level combining. However, in terms of receiver design, implementation efficiency and buffer management it can be beneficial to perform bit-level combining (buffering), especially if the FEC decoder works on bit-level (e.g. Turbo decoder).

The object of the invention is to provide a hybrid ARQ retransmission method and a corresponding receiver with lowered buffer-size requirements for HARQ bit-level combining.

This object is solved by a hybrid ARQ transmission method as defined by claim 1. Preferred embodiments of the retransmission method are subject to various dependent claims. Further, the object is solved by a corresponding receiver as recited in claim 11.

With respect to the prior art bit-level combining methods, where the soft information of all bits has to be buffered, according to the invention, the retransmission method only requires the buffering of the soft information of the most significant bits MSBs which leads to a significantly lowered buffer-size requirement. With respect to symbol-level combining, the advantages of bit-level combining in terms of receiver design, implementation, efficiency and buffer management remain at equal or even lower buffer-size requirements. The invention will be more readily understood from the following detailed description with reference to the accompanying drawings shown:

Figure 3:
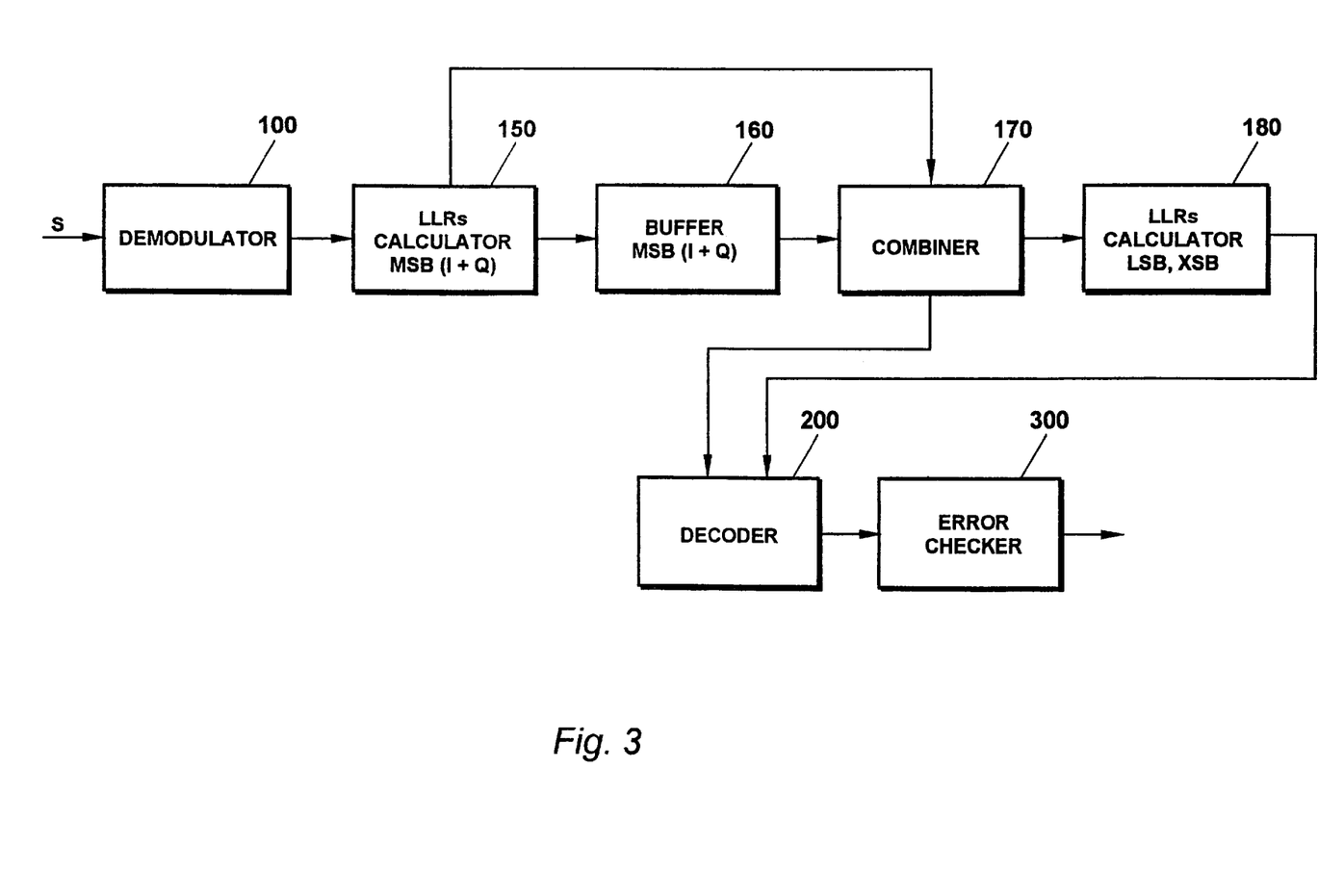
FIG. 3: relevant parts of a receiver of a communication system, in which the present invention is employed.

With reference to FIG. 3, those parts of a communications receiver which are concerned with the subject matter of the present invention are illustrated.

A demodulator 100 receives complex modulation symbols S, which have been transmitted by a transmitter of a communication system. For the first transmission, for all modulation symbols the LLRs (MSBs and LSBs) are calculated.

In accordance with an automatic repeat request scheme, the receiver requests the transmitter to send additional transmissions of erroneously received data packets. For each received modulation symbol S, soft information, in the preferred embodiment of log-likelihood-ratios (LLRs), is calculated in a corresponding calculator 150 for the high reliable, most significant bits (MSBs) as well for the real part (I-part) as for the imaginary part (Q-part) and subsequently stored in a buffer 160.

In a subsequent combiner 170, the LLRs of the actual received data packet and the LLRs from previously received data packets which are stored in the buffer 160 are combined for each matching modulation symbol. From this combined soft-information (accounting for all received transmissions), the LLRs for the remaining bits up to the least significant bits (LSBs) are calculated in an LLRs calculator 180 and input together with the LLRs of the MSB calculator 150 into a decoder 200. The decoder outputs its infobits to an error checker 300 for detecting and possibly correcting errors. The decoder preferably applies a forward error correction scheme employing the received soft information. Such decoders can be implemented as described, for example, in C. Heergard, S. B. Wicker, *Turbo Coding*, Kluwer Academic Publishers, ISBN 0-7923-8378-8, 1999 or F. Xiong, *Digital Modulation Techniques*, Artech House Publichers, ISBN 0-89006-970-8, 2000.

All components described above are in its detailed implementation known to a skilled person in the art. A detailed description has therefore been omitted for simplicity.

The advantage of the receiver design proposed above is that the required buffer-size is significantly reduced as only the MSBs are stored. This reduces the receiver complexity and allows easier calculation and buffer management because the HARQ information is buffered at bit level and the FEC decoder preferably also works at bit level.

Next, the method of the invention will be described in more detail with linearly approximated LLRs as soft-information at the receiver.

Linear Approximation for LLR Calculation (Single Transmission)

Figure 2:
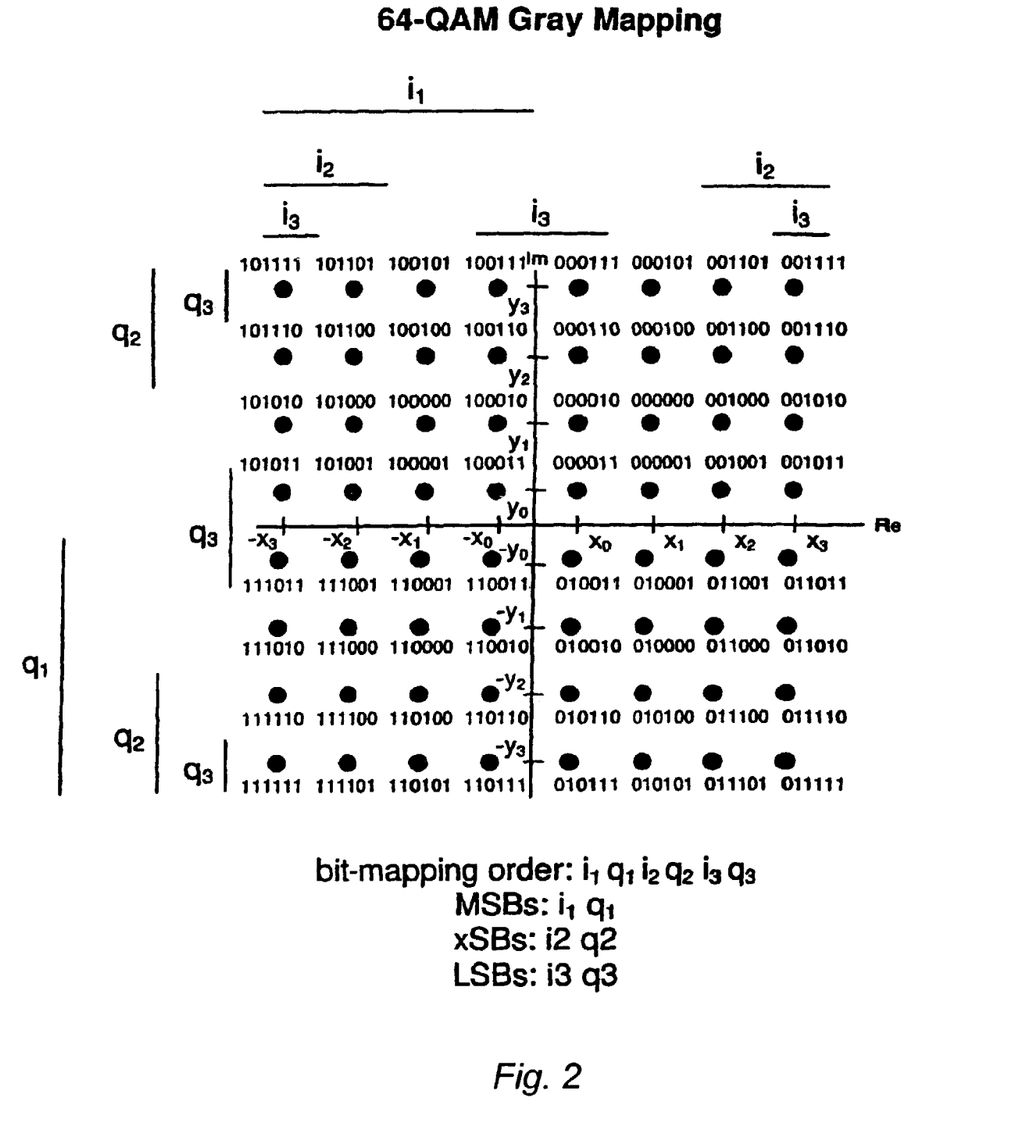
FIG. 2: a Gray encoded signal constellation for 64-QAM.

Before describing the rule for how to calculate the LLRs after multiple transmissions, first a description of the approximation of the LLR in the single transmission case is given. The calculations are performed for 16-QAM and 64-QAM, but can easily extended to higher order M-QAM schemes. The indices for the coordinates of the signal constellation points $(x_i, y_i)$ and the considered Gray-mappings for LLR calculations are according to FIG. 1 and FIG. 2. For simplicity the following description is made for the i-bits only. The procedure for the q-bits is analogue, where $\text{Re}\{r\}$ has to be replaced by $\text{Im}\{r\}$ and $x_i$ has to be replaced by $y_i$.

MSB Approximation—$i_1$ ($q_1$)

The LLR for the MSBs is approximated as follows:

$$LLR(i_1) = \frac{P(i_1 = 1|r)}{P(i_1 = 0|r)} \approx -4A_1 K x_0 \text{Re}\{r\} \quad (4)$$

with $$K = 10^{\frac{E_s/N_0}{10}}:$$

K represents a measure for the channel quality
$A_1 \in [0.5; 2]$: Correction Factor (preferred $A_1=1$)
r: Received (Equalized) Modulation Symbol
K is preferably calculated as indicated above, where $E_s/N_0$ represents the signal to noise ratio in the channel Approximation—$i_2$ ($q_2$)

The LLRs for $i_2$ ($q_2$) can be approximated as follows (in case of 16-QAM $i_2$ and $q_2$ are the LSBs):

$$LLR(i_2) = \frac{P(i_2 = 1|r)}{P(i_2 = 0|r)} \quad (5)$$

$$\approx 2A_2 K(x_{m+1} - x_m)|\text{Re}\{r\}| + A_3 K(x_m^2 - x_{m+1}^2)$$

and with equation LLR($i_2$) can be expressed as a function of LLR($i_1$)

$$LLR(i_2) \approx \frac{A_2(x_{m+1} - x_m)}{2A_1 x_0}|LLR(i_1)| + A_3 K(x_m^2 - x_{m+1}^2) \quad (6)$$

with $$m = \frac{\sqrt{M}}{4} - 1$$

$$K = 10^{\frac{E_s/N_0}{10}}$$

$A_2 \in [0.5; 2]$: Correction Factor (preferred $A_2=1$)
$A_3 \in [0.5; 2]$: Correction Factor (preferred $A_3=1$)
r: Received (Equalized) Modulation Symbol In case of equally spaced constellation points ($x_1=3x_0$) equation (6) generally simplifies to $$LLR(i_2) \approx \frac{A_2}{A_1}|LLR(i_1)| + A_3 K(x_m^2 - x_{m+1}^2) \quad (7)$$

Approximation—$i_3$ ($q_3$)

In case of 64-QAM the LLRs for $i_3$ ($q_3$) can be approximated as follows ($i_3$ and $q_3$ are then the LSBs):

$$LLR(i_3) = \frac{P(i_3 = 1|r)}{P(i_3 = 0|r)} \quad (8)$$

$$\approx \begin{cases} 2A_4 K(x_m - x_{m+1})|\text{Re}\{r\}|A_5 K(x_{m+1}^2 - x_m^2) \\ \quad \text{for } |\text{Re}\{r\}| < \frac{x_{\sqrt{M}/4} + x_{\sqrt{M}/4-1}}{2} \\ 2A_6 K(x_l - x_{l-1})|\text{Re}\{r\}| + A_7 K(x_{l-1}^2 - x_l^2) \\ \quad \text{otherwise} \end{cases}$$

and with equation (6) LLR($i_3$) can be expressed as a function of LLR($i_1$)

$$LLR(i_3) \approx \begin{cases} \frac{A_4(x_m - x_{m+1})}{2A_1 x_0}\left|LLR(i_1)\right| + A_5 K(x_{m+1}^2 - x_m^2) \\ \quad \text{for } |LLR(i_1)| < 2A_1 K x_0(x_{\sqrt{M}/4} + x_{\sqrt{M}/4-1}) \\ \frac{A_6(x_l - x_{l-1})}{2A_1 x_0}\left|LLR(i_1)\right| + A_7 K(x_{l-1}^2 - x_l^2) \\ \quad \text{otherwise} \end{cases} \quad (9)$$

with

-continued $$m = \frac{\sqrt{M}}{8} - 1$$

$$l = \frac{\sqrt{M}}{2} - 1 - m$$

$$K = 10^{\frac{E_S/N_0}{10}}$$

$A_4 \in [0.5;2]$: Correction Factor (preferred $A_4=1$)
$A_5 \in [0.5;2]$: Correction Factor (preferred $A_5=1$)
$A_6 \in [0.5;2]$: Correction Factor (preferred $A_6=1$)
$A_7 \in [0.5;2]$: Correction Factor (preferred $A_7=1$)
r: Received (Equalized) Modulation Symbol In case of equally spaced constellation points equation (9) simplifies for 64-QAM to $$LLR(i_3) \approx \left| \frac{A_4}{A_1} \left| LLR(i_1) \right| - 16 K x_0^2 \right| - 8 A_5 K x_0^2 \qquad (10)$$

LLR Calculation after N Transmissions

The calculation of the LLR after n transmissions is shown for the i-bits only. The procedure for the q-bits is analogue, where $\text{Re}\{r^{(n)}\}$ has to be replaced by $\text{Im}\{r^{(n)}\}$ and $x_i$ has to be replaced by $y_i$, where n indicates the n-th transmission.

MSB Calculation—$i_1$ ($q_1$)

With equation (4) the total LLR for $i_1$ ($q_1$) after the n-th transmission can be calculated as the sum of all LLRs calculated from n transmissions. In the receiver this leads to a sum of the calculated LLR of the currently received n-th transmission and the buffered sum of LLRs of previously received transmissions:

$$LLR_{tot}^{(n)}(i_1) \approx -4 A_1 K^{(n)} x_0 \cdot \text{Re}\{r^{(n)}\} + \underbrace{LLR_{tot}^{(n-1)}(i_1)}_{\text{buffered informatio}(LLR) \text{ from previous transmissions}} \qquad (11)$$

With $$LLR_{tot}^{(n-1)}(i_1) \approx \sum_{p=1}^{n-1} LLR^{(p)}(i_1):$$

Buffered info (LLR) at receiver $$K^{(n)} = 10^{\frac{(E_S/N_0)^{(n)}}{10}}$$

$A_1 \in [0.5;2]$: Correction Factor (preferred $A_1=1$)
$r^{(n)}$: Received (Equalized) Modulation Symbol at n-th Transmission Calculation—$i_2$ ($q_2$)

With equations and the total LLR for $i_2$ ($q_2$) after the n-th transmission can be expressed as a function of the total LLR $i_1$ ($q_1$):

$$LLR_{tot}^{(n)}(i_2) \approx -\frac{A_2(x_m - x_{m+1})}{2 A_1 x_0} \sum_{p=1}^{n} \left| LLR^{(p)}(i_1) \right| + \qquad (12)$$

$$A_3(x_m^2 - x_{m+1}^2) K^{(p)}$$

$$\approx -\frac{A_2(x_m - x_{m+1})}{2 A_1 x_0} \left| LLR_{tot}^{(n)}(i_1) \right| +$$

$$A_3(x_m^2 - x_{m+1}^2) \sum_{p=1}^{n} K^{(p)}$$

$$\approx -\frac{A_2(x_m - x_{m+1})}{2 A_1 x_0} \underbrace{\left| LLR_{tot}^{(n)}(i_1) \right|}_{\substack{\text{buffered total } LLR \\ \text{from } i_1 \text{ calculation}}} +$$

$$A_3(x_m^2 - x_{m+1}^2) \underbrace{K_{tot}^{(n)}}_{\substack{\text{buffered total} \\ \text{received power}}}$$

with $$m = \frac{\sqrt{M}}{4} - 1$$

$$K_{tot}^{(n)} = \sum_{p=1}^{n} K^{(p)}$$

$A_2 \in [0.5;2]$: Correction Factor (preferred $A_2=1$)
$A_3 \in [0.5;2]$: Correction Factor (preferred $A_3=1$)

In case of equally spaced constellation points equation (12) generally simplifies to $$LLR_{tot}^{(n)}(i_2) \approx \frac{A_2}{A_1} \left| LLR_{tot}^{(n)}(i_1) \right| + A_3(x_m^2 - x_{m+1}^2) K_{tot}^{(n)} \qquad (13)$$

Calculation—$i_3$($q_3$)

Analogous to the total LLR for $i_2$ ($q_2$) the total LLR for $i_3$ ($q_3$) after the n-th transmission can be calculated by use of equations (4), (8) and (9) and as follows:

$$LLR_{tot}^{(n)}(i_3) \approx \qquad (14)$$

$$\begin{cases} \frac{A_4(x_m - x_{m+1})}{2 A_1 x_0} \underbrace{\left| LLR_{tot}^{(n)}(i_1) \right|}_{\substack{\text{buffered total } LLR \\ \text{from } i_1 \text{ calculation}}} + A_5(x_{m+1}^2 - x_m^2) \underbrace{K_{tot}^{(n)}}_{\substack{\text{buffered total} \\ \text{received power}}} \\ \quad \text{for } \left| LLR(i_1) \right| < 2 A_1 K_{tot}^{(n)} x_0 \left( x_{\frac{\sqrt{M}}{4}} + x_{\frac{\sqrt{M}}{4}-1} \right) \\ \frac{A_6(x_1 - x_{l-1})}{2 A_1 x_0} \underbrace{\left| LLR_{tot}^{(n)}(i_1) \right|}_{\substack{\text{buffered total } LLR \\ \text{from } i_1 \text{ calculation}}} + A_7(x_{l-1}^2 - x_l^2) \underbrace{K_{tot}^{(n)}}_{\substack{\text{buffered total} \\ \text{received power}}} \\ \quad \text{otherwise} \end{cases}$$

with $$m = \frac{\sqrt{M}}{8} - 1$$

$$l = \frac{\sqrt{M}}{8} - 1 - m$$

$$K_{tot}^{(n)} = \sum_{p=1}^{n} K^{(p)}$$

$A_4 \epsilon [0.5;2]$: Correction Factor (preferred $A_4=1$)
$A_5 \epsilon [0.5;2]$: Correction Factor (preferred $A_5=1$)
$A_6 \epsilon [0.5;2]$: Correction Factor (preferred $A_6=1$)
$A_7 \epsilon [0.5;2]$: Correction Factor (preferred $A_7=1$)

In case of equally spaced constellation points equation (14) simplifies for 64-QAM to $$LLR_{tot}^{(n)}(i_3) \approx \left| \frac{A_4}{A_1} \right| LLR_{tot}^{(n)}(i_1) \left| -16 K_{tot}^{(n)} x_0^2 \right| - 8 A_5 K_{tot}^{(n)} x_0^2 \quad (15)$$

As stated earlier only the LLRs of the MSBs (I- and Q-parts) per modulation symbol and the sum of the total received power over all packets has to be stored. This leads for the proposed method to the following equation for the buffer-size $B_{PM}$:

$$B_{PM} = \frac{2 N b_B}{\log_2(M)} + b_K \quad (16)$$

with

| | |
|---|---|
| M | M-QAM |
| N | number of encoded bits per packet |
| $b_B$ | bit-depth for representing one soft-information (e.g. LLR) in buffer |
| $b_K$ | bit-depth for representing the sum of the received power by all packets |

The ratio of the required buffer-size to the buffer-size for symbol-level combining as described above yields for any M-QAM scheme:

$$\frac{B_{PM}}{B_{SC}} = \frac{\frac{2 N b_B}{\log_2(M)} + b_K}{\frac{2 N b_S}{\log_2(M)} + b_K} = \frac{2 N b_B + b_K \log_2(M)}{2 N b_S + b_K \log_2(M)} \quad (17)$$

If N (bits per packet) is sufficiently large equation (17) becomes approximately:

$$\frac{B_{PM}}{B_{SC}} \approx \frac{b_B}{b_S} \quad (18)$$

If it is assumed that the required bit-depth $b_B$ for buffering a LLR is smaller than the bit-depth $b_S$ for buffering one part of a complex modulation symbol, a reduction in buffer-size compared to symbol-level buffering can be achieved (e.g. reduction of 25% for $b_B=6$ and $b_S=8$).

The ratio of the required buffer-size for the inventive method to the buffer-size for conventional bit-level combining yields:

$$\frac{B_{PM}}{B_{BC}} = \frac{\frac{2 N b_B}{\log_2(M)} + b_K}{N b_B} = \frac{2}{\log_2(M)} + \frac{b_K}{N b_B} \quad (19)$$

If N (bits per packet) is sufficiently large equation (19) becomes approximately:

$$\frac{B_{PM}}{B_{BC}} \approx \frac{2}{\log_2(M)} \quad (20)$$

This corresponds to a buffer-size reduction compared to conventional bit-level combining as shown in Table 1:

TABLE 1

| Modulation Scheme | Buffer-Size Reduction |
|---|---|
| QPSK | 0% |
| 16-QAM | 50% |
| 64-QAM | 67% |
| 256-QAM | 75% |

As demonstrated above, the inventive method results in some advantages in terms of calculation complexity and buffer management. The performance for using the proposed bit-level combining method compared to the symbol-combining method is similar. In case of using linearly approximated LLRs as described herein for the proposed bit-combining and using also linearly approximated LLRs after symbol-combining, the performance is exactly the same.

The skilled person is immediately aware that other than the above described 16-QAM and 64-QAM, any other M-QAM or M-PAM (pulse amplitude modulation) for $\log_2(M) > 1$ Gray-mappings are applicable to the method of the present invention and the respective equations can be derived accordingly. As mentioned earlier, the method of the present invention is also applicable to HARQ schemes employing the retransmission of a subset of previously transmitted symbols. The derived calculation for the LLRs and the buffer size is valid for the symbols which are retransmitted and combined.

The soft-information, which can be used in connection with the present invention might be any soft-metric describing a (preferably logarithmic) measure of the probability of the corresponding bit to be a 1 or a 0. The soft information as described above are log-likelihood ratios. However, the soft-information might be a soft-metric of the respective bit calculated as a linear equation from the I and Q-components of the received modulation symbol.

The above described combining step might be a simple addition of the LLRs or soft-information and the respective calculation thereof for the remaining bits might simply be a linear function in the style of $$LLR_{XSB} = a \cdot LLR_{MSB} + b \text{ or } LLR_{XSB} = a \cdot |LLR_{MSB}| + b$$

where the function is possibly defined in sections.

The invention claimed is:

1. A hybrid ARQ retransmission method in a communication system, wherein data packets comprising at least one identical or partly identical modulation symbol having more than one bit encoded with a forward error correction technique prior to transmission are retransmitted based on a repeat request and subsequently bit-level combined on the basis of soft-information values which are input into a decoder, the method comprising:
   (a) calculating and buffering soft-information values of the most significant bits, MSBs, of each transmitted and retransmitted modulation symbol,
   (b) combining, for matching modulation symbols, the current soft-information values of the most significant bits of a received modulation symbol with the buffered soft-information values of at least one of the previous received transmitted modulation symbols, and (c) calculating soft-information values for bits other than the most significant bits of the received modulation symbol, whose soft-information values are combined, from the combined soft-information values.

2. The retransmission method according to claim 1, wherein each soft-information value is a logarithmic measure of the probability that the corresponding bit of a modulation symbol is a 1 or a logarithmic measure of the probability that the corresponding bit is a 0.

3. The retransmission method according to claim 1, wherein each soft-information value is a log-likelihood ratio.

4. The retransmission method according to claim 3, wherein the soft-information values calculated for the bits other than the most significant bits are calculated by applying a linear function $$LLR_{XSB}=a \cdot LLR_{MSB}+b \text{ or } LLR_{XSB}=a \cdot |LLR_{MSB}|+b$$

where $LLR_{XSB}$ is the log-likelihood ratio calculated for the bits other than the most significant bits, $LLR_{MSB}$ is the log-likelihood ratio calculated for the most significant bits, and a and b define factors.

5. The method of claim 4, wherein the linear function is applied through the use of multiple calculations.

6. The retransmission method according to claim 1, wherein each soft-information value is a soft metric of the corresponding bit calculated as a linear equation from at least one of an I component and a Q component of the received modulation symbol.

7. The retransmission method according to claim 1, wherein the soft-information values are combined by addition.

8. The retransmission method according to claim 1, wherein the modulation scheme for modulating the transmitted and retransmitted symbol is M-QAM, $\log_2 (M)>2$, with Gray mappings.

9. The retransmission method according to claim 1, wherein the modulation scheme for modulating the transmitted and retransmitted symbol is M-PAM, $\log_2 (M)>1$, with Gray mappings.

10. The retransmission method according to claim 1, further comprising buffering a measure of the channel quality.

11. The method of claim 10, wherein the buffered measure of the channel quality is the sum of estimated, signaled, or both estimated and signaled signal-to-noise ratios, $E_s/N_0$, over all transmissions.

12. The method according to claim 1, wherein soft-information values for the least significant bits of the received modulation symbol, whose soft-information values are combined, are calculated in step (c).

13. A receiver for a hybrid ARQ retransmission method in a communication system, the receiver comprising:
 a demodulator that receives data packets comprising at least one identical or partly identical modulation symbol having more than one bit encoded with a forward error correction technique prior to transmission,
 a calculator that calculates soft-information values of the most significant bits of each transmitted and retransmitted modulation symbol,
 a buffer that stores the calculated soft-information values,
 a combiner that combines current soft-information values of the most significant bits of a received modulation symbol with the buffered soft-information values of at least one of the previous received modulation symbols, and
 a calculator that calculates soft-information values for bits other than the most significant bits of the received modulation symbol, whose soft-information values are combined, from the combined soft-information values.

14. A receiver according to claim 13, wherein the calculator that calculates the soft-information values of the most significant bits and the calculator that calculates the soft-information for the bits other than the most significant bits are log-likelihood ratio calculators.

15. The receiver according to claim 14, further comprising a decoder that receives the soft-information values from the log-likelihood calculators that calculate the soft-information values for the most significant bits and the other bits.

* * * * *